United States Patent Office 3,786,044
Patented Jan. 15, 1974

---

3,786,044
(6-PYRROL-1-YL)-3-PYRIDINEACETIC ACID DERIVATIVES
Franz Ostermayer, Riehen, Switzerland, assignor to Ciba-Geigy Corporation, Ardsley, N.Y.
No Drawing. Filed May 15, 1972, Ser. No. 253,615
Claims priority, application Switzerland, May 19, 1971, 7,375/71; Apr. 18, 1972, 5,693/72
Int. Cl. C07d 31/36
U.S. Cl. 260—295.5 R    8 Claims

ABSTRACT OF THE DISCLOSURE

Compounds of the formula

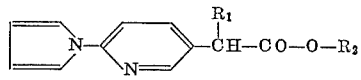

wherein $R_1$ represents hydrogen or a methyl or ethyl group and $R_2$ represents hydrogen or a lower alkyl group containing from 1 to 4 carbon atoms and the salts with bases derived from the free carboxylic acids have anti-inflammatory, mild analgesic and antipyretic action, they are active ingredients of pharmaceutical compositions and are useful for the treatment of inflammatory diseases and of pain of varying origin. An illustrative example is α-methyl-6-(pyrrol-1-yl)-3-pyridyl-acetic acid.

---

The invention relates to new substituted pyridine-acetic acids, their lower alkyl esters and salts, process for the manufacture of these compounds, pharmaceutical preparations which contain these compounds and their use.

The invention relates in particular to pyridine-acetic acid compounds of the formula

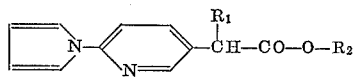 (I)

wherein $R_1$ represents hydrogen or a methyl or ethyl group and $R_2$ represents hydrogen or a lower alkyl group containing from 1 to 4 carbon atoms, the salts with bases derived from the free carboxylic acids and process for the manufacture of the new compounds.

In the Formula I, a lower alkyl group $R_2$ containing from 1 to 4 carbon atoms represents the methyl, ethyl, n-propyl, isopropyl, n-butyl, isobutyl and the tert.butyl group. Preferred compounds are those in which $R_1$ is hydrogen or methyl and $R_2$ is hydrogen.

As salts of carboxylic acids which fall under the Formula I there may be mentioned primarily the pharmacologicaly tolerable salts, e.g. the alkali salts, such as the sodium, potassium, and lithium salts, alkaline earth salts, such as magnesium and calcium salts and ammonium salts, as well as salts with organic bases, such as lower alkylamines which are optionally substituted by hydroxy, amino or phenyl, for example ethylamine, 2-aminoethanol, bis-2-hydroxy-ethylamine, 2-dimethylaminoethanol, 2-diethylaminoethanol, ethylenediamine, benzylamine, also salts with procaine, pyrrolidine, piperidine, morpholine, 1-ethylpiperidine or 2-piperidinoethanol, or salts with basic ion exchangers.

The new compounds of the Formula I and the salts which are derived from the free carboxylic acids possess valuable pharmacological properties, in particular anti-inflammatory, mild analgesic and antipyretic action, as well as a favourable therapeutic index. The anti-inflammatory action of compounds of the Formula I is shown, for example, in the kaolin pawoedema test on rats (L. Riesterer and R. Jaques, Helv. physiol. pharmakol. Acta 25, 156 (1967), in which, for example, α-methyl-6-(pyrrol-1-yl)-3-pyridine-acetic acid and the corresponding α-ethyl compound possess a demonstrable action in peroral administration of about 3 to 30 mg./kg. The mild analgesic action occurs in peroral administration of about 20 to 40 mg./kg., for example in the 2-phenyl-1,4-benzoquinone test on mice (H. Helfer and R. Jaques, Pharmacology 3, 41 (1970)). The antipyretic action of the compound of the Formula I is demonstrated in the yeast-induced fever test on rats. The test compound is administered orally to rats which have been injected intramuscularly 16–18 hours previously with 1 ml. per 100 g. body weight of a 15% suspension of baker's yeast in distilled water with the addition of 1% tragacanth and 1% sodium chloride. The feverish temperature induced by the yeast is taken rectally one hour and an half hour before the test substance is administered and subsequently every half hour for up to 5 hours. The maximum drop in temperature and the arithmetic mean over the 5 hours following the administration of the test substance are determined and compared with the average of the two temperatures taken before the administration. The compounds of the Formula I, for example the cited α-methyl- and the α-ethyl-6-(pyrrol-1-yl)-3-pyridine-acetic acid, display antipyretic activity in this test when amounts of about 100 mg./kg. are administered perorally.

By virtue of these properties and a very favorable therapeutic index, the compounds of the present invention may be used for the alleviation and relief of pains of varying origin, and for the treatment of rheumatic and other inflammatory complaints. Administration may be by the oral, rectal or parenteral route.

For their intended use in mammals, the compounds of the present invention are administered internally in daily dosage of about 1 to about 100 mg./kg., although the amounts administered depend upon the species, age and weight of the subject under treatment, as well as the particular condition to be treated and the mode of administration.

The compounds of the present invention are obtained by methods which are known per se. Thus they may be formed, by example, if in a compound of the formula

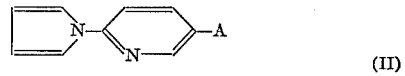 (II)

in which A represents a radical which may be converted into the group $—CH(R)_1—COOR_2$ (IIa), this radical is so converted and, if desired, within the definition of the final products a resulting compound of the Formula I is converted into another compound of the Formula I, and/or a resulting salt is converted into the free compound or a resulting free compound is converted into a salt.

Thus in a compound of the Formula II, wherein A represents a radical of the formula $—CH(R_1)—A_1$ (IIb), in which $A_1$ represents a functionally modified carboxyl group which differs from the free carboxyl group or from a carboxyl group which is esterified by lower alkyl containing from 1–4 carbon atoms, it is possible to convert the group $A_1$ into a free carboxyl group or into a carboxyl group which is esterified by lower alkyl containing from 1–4 carbon atoms, and, if desired, within the definition of the final products to convert a resulting compound of the Formula I into another compound of the Formula I, and/or, if desired, to convert a resulting salt into the free compound or a resulting free compound into a salt.

Examples of suitable functionally modified carboxyl groups $A_1$ are e.g. in particular the cyano group, and optionally substituted carbamoyl or thiocarbamoyl groups, which may be monosubstituted e.g. by hydroxy or mono- or disubstituted by monovalent or bivalent aliphatic hydrocarbon radicals, such as lower alkyl, for example methyl, ethyl or isopropyl, or lower alkylene, for example 1,4-butylene, such as hydroxylamino, lower alkylamino or di-lower alkylaminocarbonyl or -thiocarbonyl, etherified hydroxy-imidoyl or mercapto-imidoyl, such as lower alkoxy-imidoyl or lower alkylthio-imidoyl, wherein lower alkyl has the meaning given hereinbefore, or an esterified carboxyl group which differs from a carboxyl group which is esterified by lower alkyl containing from 1–4 carbon atoms, such as phenyl-lower alkoxycarbonyl, e.g. benzyloxycarbonyl.

The conversion of $A_1$ into the desired group of the formula —CO—$OR_2$ is carried out by hydrolysis or alcoholysis. The hydrolysis is carried out in an acid or preferably in an alkaline medium.

The nitriles of the Formula II may be converted either direct into the acids and esters which fall under the Formula I or by the indirect route via the corresponding optionally substituted amides and thioamides, including hydroxamic or thiohydroxamic acids, or imidoesters or imidothioesters or via other carboxylic esters which do not fall under the Formula I. The direct hydrolysis of the nitriles to the acids of the Formula I takes place preferably in an alkaline medium, for example in the presence of an aqueous alkali metal or alkaline earth metal hydroxide, such as sodium or potassium hydroxide, optionally with the addition of an organic solvent, such as a lower alkanol, e.g. n-butanol or ethanol, and usually at elevated temperature.

The amides or thioamides which fall under the Formula II, including the hydroxamic or thiohydroxamic acids, also the imidoesters, thioimidoesters and carboxylic esters, may be hydrolyzed—like the nitriles—preferably in an alkaline medium e.g. by treatment with a lower alkanolic or lower alkanolic aqueous alkali metal hydroxide. The alkaline hydrolysis yields the salts of the corresponding carboxylic acids of the Formula I, which may be converted subsequently into the free carboxylic acids.

Esters which wall under the Formula I may be obtained from the corresponding nitriles by treatment with hydrogen halides in a lower alkanol containing from 1–4 carbon atoms at elevated temperature, or by transesterification of an ester which differs from a lower alkyl ester containing from 1–4 carbon atoms by treatment with a lower alkanol containing from 1–4 carbon atoms in the presence of a transesterification catalyst, such as a corresponding alkaline earth, e.g. sodium or potassium, lower alkanolate.

It is also possible to manufacture the compounds of the General Formula I by a process wherein in a compound of the Formula II, wherein A represents a group of the formula —C($A_2$)($R_1$)—$COOR_2$ (IIc), in which $A_2$ represents a group which may be replaced by hydrogen, the group $A_2$ is so replaced and, if desired, the additional steps are carried out.

A group $A_2$ which may be replaced by hydrogen is e.g. a carboxyl group, or a lower alkanoyl group, such as an acetyl group.

A carboxyl group $A_2$ may be split off by decarboxylation, preferably at elevated temperature, for example if desired or necessary in the presence of a base, such as an alkali metal hydroxide, for example sodium or potassium hydroxide, in an organic, organic-aqueous or aqueous medium, or of an alkali metal alkanolate in an anhydrous medium, or of an acid reagent, such as an aqueous mineral acid, for example sulphuric or hydrochloric acid.

As reaction medium there is used, for example, a lower alkanol, such as methanol, ethanol, isopropanol or n-butanol, a lower alkylene diol or a monoalkyl ether thereof, e.g. ethylene glycol, 2-methoxyethanol or 2-ethoxyethanol, it being possible to optionally add water to the cited solvents in the volume ratio of about 10:1 to about 1:2. In addition, it is also possible to use water or e.g. a mixture of water with water-soluble, ether-like solvents, such as dioxan or tetrahydrofuran, as reaction medium.

A lower alkanoyl group, in particular an acetyl group, can be split off and replaced by hydrogen by treating the corresponding starting material of the Formula II with a strong basic agent, such as an alkali metal alkanolate, e.g. sodium or potassium alkanolate, preferably containing from 1–4 carbon atoms, the process being carried out preferably at elevated temperature and in a suitable, optionally aqueous, solvent.

It is also possible to obtain the compounds of the present invention by a process wherein a compound of the formula

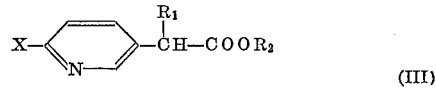

in which X represents a group which can be converted into the pyrrol-1-yl radical, this group is so converted, and, if desired, a resulting compound within the definition of the final products is converted into another compound.

Thus it is possible to react a compound of the Formula III, wherein X is an amino group, or a salt thereof, with succinaldehyde or with a reactive functional derivative thereof, and, if desired, to carry out the additional steps.

Reactive functional derivatives of the succinaldehyde may be derived chiefly from its mono- or bis-enol, mono- or bis-hydrate or polymer form, in which the hydroxy groups may be esterified or etherified. In particular, it is possible to use compounds of the formula

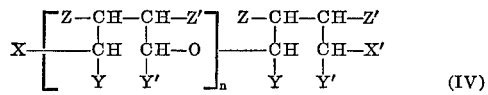

wherein X and X' independently represent radicals of the formulae $R_3$—O— and $R_3$—CO—O—, in which $R_3$ represents a hydrocarbon radical which is optionally substituted by halogen, preferably an aliphatic hydrocarbon radical, and also represents bromine or chlorine atoms, X together with Y and/or X' together with Y' also represent the oxo radical =O, Y and Y' independently represent radicals of the formulae $R_3$—O— or $R_3$—CO—O— defined hereinbefore or both together represent the epoxy radical —O—, or Y and Z or Y' and Z' together each represent a covalent bond, and Z and Z' represent hydrogen atoms, if together with Y or Y' they do not represent a covalent bond, and $n$ represents 0 or a lower integer, e.g. from 1 to 10, or mixtures of such compounds.

Besides succinaldehyde, there may be mentioned as examples: acetals of succinaldehyde, such as succinaldehyde-monodiethyl-acetal and -bisdimethyl-acetal, its acylals, such as succinaldehyde-1,1-diacetate, enol ethers, such as 1,4-diphenoxy-butadiene and enol esters, such as 1,4 - diacetoxybutadiene, also 2,5 - di - lower alkoxy-tetrahydrofurans, such as 2,5 - dimethoxy - tetrahydrofuran, in addition 2,5 - diacyloxy - tetrahydrofurans, such as 2,5-diacetoxy-tetrahydrofuran, and 2,5-dihalogeno-tetrahydrofurans, such as 2,5-dichlorotetrahydrofuran. Compounds of the General Formula IV, in which $n$ is 1 or greater than 1, and in particular mixtures of such compounds in which $n$ is different, are formed e.g. by treating polymer succinaldehyde with amounts of acetalizing or acylating substances or mixtures of substances which are smaller than the amounts equivalent to the succinaldehyde units which are present.

The reaction is carried out preferably in an inert solvent, for example a lower alkanol such as methanol or ethanol, or a lower alkanecarboxylic acid, such as acetic acid, an optionally chlorinated hydrocarbon, for example benzene, toluene, o-dichlorobenzene and chloroform, or in a lower alkanecarboxylic nitrile, for example acetonitrile, advantageously in the presence of a condensation agent, such as a strong acid agent, for example an organic sulphonic acid, e.g. toluenesulphonic acid.

According to a further variant of the process, compounds of the present invention can be obtained if in a compound of the Formula III, wherein X represents a 2-carboxy-pyrrol-1-yl group, this latter is decarboxylized to a pyrrolyl group, and, if desired, the additional steps are carried out.

The decarboxylation can take place in the presence or absence of a diluent, preferably a high boiling organic base, e.g. a pyridine which is optionally substituted by lower alkyl, such as collidine, or a bicyclic nitrogen base, such as quinoline, also in the presence or absence of a decarboxylation catalyst, such as copper or a copper salt, e.g. copper oxide, preferably at elevated temperatures, preferedly between 170–230° C. According to a preferred method of carrying out this reaction, the starting compound of the Formula III, wherein X is a 2-carboxy-pyrrol-1-yl group, is manufactured in situ from compounds of the Formula III, wherein X represents the amino group, and from a compound of the formula HOOC—(CHOH)$_4$—COOH (V), in particular from mucic or saccharic acid, by heating in the presence or absence of a high boiling solvent, for example a hydrocarbon, such as xylene, or of an ether, such as diethylene glycol dimethyl ether, and the resulting 2-carboxy-pyrrol-1-yl compound is heated further until complete decarboxylation has taken place.

In a further variant of the process, it is possible to obtain compounds of the present invention if in a compound of the Formula III, wherein X represents a 3-pyrrolin-1-yl group, this latter is dehydrogenated to a pyrrol-1-yl group, and, if desired, the additional steps are carried out.

The dehydrogenation can be carried out catalytically, for example in the presence of transition metal catalysts, such as palladium, if desired on a carrier, such as activated charcoal, e.g. in an inert solvent, for example in a hydrocarbon, such as xylene, or in an ether, such as diphenyl ether, or in the presence of an oxidant, for example oxygen, a peroxide, such as hydrogen peroxide, or an organic peracid, such as perbenzoic acid or benzoyl peroxide, a halogenating agent, such as chloranil, also e.g. an inorganic oxidant, such as a permanganate, for example potassium permaganate, chromic acid or selenium dioxide, preferably in the presence of a solvent, such as water and/or a lower alkanecarboxylic acid.

Resulting compounds can be converted into one another in known manner. Thus, for example, it is possible to esterify free acids by using lower alkanols containing from 1–4 carbon atoms in the presence of esterifying agents, such as strong acids, e.g. hydrohalic acids such as hydrochloric acid, oxyacids such as sulphuric acid, optionally substituted benzenesulphonic acids such as benzenesulphonic acid or p-toluenesulphonic acid, Lewis acids, such as boron trifluoride, and agents which split off water, such as di-lower alkyl or dicycloalkyl carbodiimides, for example dicyclohexyl carbodiimide, or of diazo-lower alkanes containing from 1–4 carbon atoms, e.g. diazomethane, and in addition to convert them into acid halides by treatment with suitable halogenating agents, such as thionyl halides, e.g. thionyl chloride, or phosphorus halides or phosphorus oxyhalides, e.g. phosphorus chloride or oxychloride. Resulting acid halides can be converted into esters by treatment with alcohols.

By treatment with suitable basic agents, such as aqueous alkali metal hydroxides, it is possible to hydrolyze resulting esters to free acids or to transesterify them into other esters with alcohols in the presence of acid or alkaline agents, such as mineral acids or complex heavy metal acids, and alkali metal carbonates or alcoholates.

Resulting salts or esters, in which $R_1$ represents hydrogen, can be metallized in the α-position to the functionally modified carboxyl group, for example by treatment with alkali metals or derivatives thereof, such as organic alkali metal compounds, e.g. phenyl lithium or sodium triphenylmethyl, or alkali metal (such as sodium) hydrides, amides or alcoholates, and then reacted with a reactive ester of an alcohol of the formula $R_1$—OH, such as a corresponding halide e.g. chloride, bromide or iodide, also with a sulphonic acid ester, such as methanesulphonic and toluenesulphonic ester, as well as dimethyl sulphate and diethyl sulphate, and an organic group $R_1$ thus introduced in the α-position.

A resulting free acid can be converted into a salt in known manner, for example by reaction with an approximately stoichiometric amount of a suitable salt-forming agent, such as ammonia, an amine or an alkali metal or alkaline earth metal hydroxide, carbonate or hydrogencarbonate. Ammonium or metal salts which can be obtained in this way can be converted into the free acid by treatment with an acid, for example hydrochloric acid, sulphuric acid or acetic acid, until the required pH is attained.

The salts may be used for purification and for identification of the free compounds. Thus it is possible to convert free compounds into their salts, to isolate these from the crude mixture and then to obtain the free compounds from the isolated salts. Because of the close relationship between the new compounds in the free form and in the form of their salts, what is stated above and hereinafter with reference to the free compounds or the salts refers likewise also to the corresponding salts or free compounds, wherever this applies.

Resulting isomer mixtures can be separated into the individual isomers in known manner, e.g. by fractional distillation or crystallization and/or by chromatography. Racemic products can be resolved into the optical antipodes, for example by separation, such as fractional crystallization, from mixtures of diastereoisomeric salts, e.g. with d- or l-tartaric acid, or with d-α-phenylethylamine, d-α-(1-naphthyl)-ethylamine or l-cinchonidine, and, if desired, by liberating the free antipodes from the salts.

The above reactions are carried out by known methods, for example in the presence or absence of diluents, preferably those which are inert towards the reactants and are able to dissolve them, if necessary in the presence of catalysts, condensation or neutralizing agents, in an inert gas atmosphere, e.g. in an atmosphere of nitrogen, while cooling or heating and/or under elevated pressure.

The invention relates also to those embodiments of the process in which a compound obtainable as an intermediate product at any stage is used as starting material and the missing step or steps are carried out with this compound, or the process is discontinued at any stage, or in which starting materials are formed under the reaction conditions or are used in the form of salts or reactive derivatives.

The new compounds of the Formula I and the salts of the free acids which fall under the Formula I are, as previously mentioned, administered perorally, rectally or parenterally.

Suitable unit dose forms, such as coated tablets, tablets, suppositories or ampoules, contain as active substance preferably 10 to 500 mg. of a compound of the Formula I or of a salt of one of the free acids which fall under this formula with a pharmaceutically tolerable inorganic or organic base.

Unit dose forms for the peroral administration contain preferably between 10–90% of active substance. To manufacture these, the active substance can be combined, for example, with solid carriers in powder form, such as carbohydrates, for example lactose, saccharose, sorbitol or mannitol; starches, such as potato starch, maize starch or amylopectin, also laminaria powder or citrus pulp powder, cellulose derivatives or gelatine, optionally with the addition of lubricants, such as magnesium or calcium stearate or polyethylene glycols, for the manufacture of tablets or coated tablet cores. The latter can be coated, for example, with concentrated sugar solutions which contain in addition, for example, gum arabic, talcum and/or titanium dioxide, or with a lacquer which is dissolved in readily volatile organic solvents or solvent mixtures. It is possible to add dyes to these coatings, for example to distinguish different doses of active substance. Further suitable oral unit dose forms are push-fit capsules of gelatine, and also soft, sealed capsules of gelatine and a plasticizer, such as glycerol. The former contain the active substance preferably in granule form in admixture with lubricants, such as talcum or magnesium stearate, and optionally stabilizers, such as sodium metabisulphite ($Na_2S_2O_5$) or ascorbic acid. In soft capsules, the active substance is preferably dissolved or suspended in suitable liquids, such as liquid polyethylene glycols, it being possible likewise to add stabilizers.

Suitable unit dose forms for rectal administration are, for example, suppositories, which consists of a combination of an active substance with a suppository base composition based on natural or synthetic triglycerides (for example cocoa butter), polyethylene glycols or suitable higher fatty alcohols, and gelatine rectal capsules which contain a combination of the active substance with polyethylene glycols.

Ampoule solutions for parenteral, especially intramuscular or intravenous administration, contain e.g. a compound of the General Formula I in a concentration of preferably 0.5–5% of an aqueous dispersion prepared with conventional hydrotropic agents and/or emulsifying agents and optionally with stabilizing agents, or an aqueous solution of a pharmaceutically tolerable water-soluble salt of one of the free acids which fall under the Formula I.

Further parenteral application forms which may be cited are, for example, lotions, tinctures and ointments for percutaneous administration which are prepared with the conventional adjuvants.

The following directions will serve to illustrate the manufacture of a number of typical application forms in more detail:

(a) 1000 g. of active substance e.g. 6-(pyrrol-1-yl)-3-pyridine-acetic acid are mixed with 550 g. of lactose and 292 g. of potato starch, the mix is moisted with an alcoholic solution of 8 g. of gelatine and granulated through a sieve. After the granules have been dried they are mixed with 60 g. of potato starch, 60 g. of talcum and 10 g. of magnesium and 20 g. of highly disperse silica and the mixture is pressed into 10,000 tablets each weighing 200 mg. and containing 100 mg. of active substance. If desired, the tablets may be provided with breaking notches to adjust the dosage more finely.

(b) 200 g. of active substance, e.g. 6-(pyrrol-1-yl)-3-pyridine-acetic acid are thoroughly mixed with 16 g. of maize starch and 6 g. of highly disperse silicium dioxide. The mixture is moistened with a solution of 2 g. of stearic acid, 6 g. of ethyl cellulose and 6 g. of stearin in app. 70 ml. of isopropanol and granulated through a sieve (Ph. Helv. V). The granules are dried for about 14 hours and then pressed through a sieve III–IIIa. They are subsequently mixed with 16 g. of maize starch, 16 g. of talcum and 2 g. of magnesium stearate and pressed into 1000 coated tablet cores. These latter are coated with a concentrated syrup of 2 g. of lac, 7.5 g. of gum arabic, 0.15 g. of dye, 2 g. of highly disperse silicium dioxide, 25 g. of talcum and 53.35 g. of sugar and dried. The resulting coated tablets each weigh 360 mg. and contain 200 mg. of active substance.

(c) 50 g. of α-methyl-6-(pyrrol-1-yl)-3-pyridine-acetic acid are dissolved in a mixture of 232 ml. of N sodium hydroxide solution and 500 ml. of boiled out pyrogen-free water and the solution is made up to 2000 ml. with such water. The solution is filtered, filled into 1000 ampoules (2 ml.) and sterilized. One 2 ml. ampoule contains 50 mg. of α-methyl-6-(pyrrol-1-yl)-3-pyridine-acetic acid as active substance in the form of the sodium salt.

(d) 50 g. of 6-(pyrrol-1-yl)-3-pyridine-acetic acid and 1950 g. of finely ground suppository base composition (for example cocoa butter) are thoroughly mixed and then the mix is melted. From the melt, which is kept homogeneous by stirring, 1000 suppositories each weighing 2 g. are cast. They each contain 50 mg. of active substance.

(e) 60 g. of polyoxyethylene sorbitol monostearate, 30 g. of sorbitol monostearate, 150 g. of paraffin oil and 120 g. of stearyl alcohol are melted together; then 50 g. of 6-(pyrrol-1-yl)-3-pyridine-acetic acid (finely pulverized) are added and 590 ml. of water preheated to 40° C. are emulsified in. The emulsion is stirred until it cools to room temperature and filled in tubes.

The compounds which are used as starting materials can be obtained likewise by methods which are known per se.

Starting compounds of the Formula II, wherein A corresponds to the group —$CH(R_1)$—$A_1$ (IIb), in which $A_1$ is a cyano group, are obtained, for example, by starting from a 6-amino-nicotinic ester, in particular a lower alkyl e.g. ethyl ester, wherein the amino group is converted into the pyrrol-1-yl group with succinaldehyde or a reactive functional derivative thereof, as described hereinbefore.

The resulting 6-(pyrrol-1-yl)-nicotinic esters, for example lower alkyl esters, such as the 6-(pyrrol-1-yl)-nicotinic ethyl ester, are reduced to the 6-(pyrrol-1-yl)-3-pyridine-methanol in known manner, e.g. using complex aluminum hydrides, such as sodium-bis(2-methoxyethoxy)aluminum hydride. The resulting compound is in turn converted in known manner into an activated ester thereof, for example into the 2-(pyrrol-1-yl)-5-chloromethyl-pyridine by treatment with thionyl chloride, and from which the 6-(pyrrol-1-yl)-3-pyridine-acetonitrile which falls under the Formula II is manufactured by reaction with an alkali cyanide, e.g. sodium cyanide.

It is possible to manufacture α-methyl- and α-ethyl-6-(pyrrol-1-yl)-3-pyridine-acetonitriles which fall under the Formula II from the acetonitrile which is unsubstituted in the α-position either by direct alkylation, or, advantageously, by alkoxycarbonylation in the α-position, subsequent α-alkylation and then partial hydrolysis and decarboxylation of the alkoxycarbonyl group. The alkoxycarbonylation is carried out using an ester of carbonic acid, such as diethyl carbonate, and in the presence of a base such as sodium methylate. The subsequent alkylation is carried out using e.g. a methyl or ethyl halide, in particular an iodide or bromide, in the presence of an alkaline condensation agent, for example an alkali amide or hydride, such as sodium amide, lithium hydride, an alkali alkyl or aryl, such as butyl lithium, phenyl lithium, sodium triphenylmethyl, of an alkali alkanolate or hydroxide, such as sodium methylate, or potassium hydroxide, with inert organic solvents being used as reaction medium, for example dimethyl formamide, diethyl ether, benzene or toluene, or with the use of the cited alkali metal alcoholates or alkali metal hydroxides also lower alkanols such as methanol or ethanol. The partial hydrolysis of the alkoxycarbonyl group is carried out using e.g. an alkali hydroxide, such as sodium hydroxide, at room temperature or at slightly elevated temperature, in the process of which decarboxylation likewise occurs.

Carboxylic acid esters which fall under the Formula II can be manufactured from these nitriles by alcoholysis, wherein other alcohols are used, such as lower alkanols containing from 1–4 carbon atoms, for example an optionally substituted benzyl alcohol. Amides which fall under the Formula II can be obtained from the corresponding nitriles by known methods and the imido esters are obtained by the successive action of hydrogen chloride and an alcohol, such as a lower alkanol, in anhydrous medium, in particular in absolute ether. Hydroxamic acids which fall under the Formula II can be obtained from the esters or amides which likewise fall under this formula by reaction with hydroxylamine. Thioamides which fall under the Formula II can be manufactured from the corresponding nitriles or amides by treatment with hydrogen sulphide or phosphorus pentasulphide. A further process of the manufacture of thioamides which fall under the Formula II consists in heating 6-(pyrrol-1-yl)-3-acetylpyridine with ammonium polysulphide or with ammonia or a primary or secondary amine and sulphur, according to the methods of Willgerodt or Willgerodt-Kindler. The reaction with ammonium polysulphide is carried out in a sealed vessel, for example in a medium in which one or preferably both reactants are at least partially soluble, for example dioxan.

Starting materials of the general Formula II, wherein A represents a group of the formula —$C(A_2)$ $(R_1)$—$COOR_2$(IIc) 

are manufactured, for example, starting from 6-(pyrrol-1-yl)-3-pyridine-acetonitrile. The nitrile is condensed with lower dialkyl carbonates, lower oxalic acid dialkyl esters or acetic acid alkyl esters, using alkali metal alkanolates, in the process of which compounds of the Formula II containing a hydrogen atom as the radical $R_1$ are obtained. The alkali metal compounds of these intermediate products can be reacted advantageously with reactive esters of methanol or ethanol to give compounds of the Formula II containing a radical $R_1$ which is other than hydrogen.

In the resulting compounds, it is possible to convert the nitrile group by alcoholysis and/or hydrolysis into the desired optionally esterified carboxy group, in the manner described hereinbefore.

The compounds of the Formula III required as starting material, wherein X represents the amino group, can for example be manufactured likewise starting from the 6-aminonicotinic acid or from an ester thereof. The amino group of the cited nicotinic acid or of its ester is protected firstly by one or optionally two of the conventional protective groups, e.g. the benzyl, carbobenzlyoxy or the acetyl group, whereupon the acid or ester group is reduced to the hydroxymethyl group with a reducing agent which leaves the protected amino group intact, for example with diborane in tetrahydrofurane.

The resulting hydroxymethyl compound is treated firstly with an acid chloride such as thionyl chloride and subsequently with an alkali cyanide, for example sodium cyanide, in the process of which the 6-amino-3-pyridine-acetonitrile is formed whose amino group still carries the initial protective group. The methyl or ethyl group $R_1$ can be introduced at this stage by one of the alkylating processes described hereinbefore. If a methyl or ethyl group $R_1$ is to be introduced, it is advisable at the outset to select the protective group which is present at the amino group in such a way that the alkylation can take place specifically at the carbon atom of the methylene group without an N-alkylation resulting simultaneously. This can be achieved if both hydrogen atoms of the amino group are replaced by two of the cited protective groups. The protective groups are split off by subsequent hydrolysis or hydrogenolysis whereupon the cyano group is hydrolysed to the corresponding carboxylic acid. Optionally, the conditions may be so chosen that the removal of the protective group and the hydrolysis of the cyano group takes place in a single step. For example, the 6-amino-3-pyridineacetic acid is obtained in a single step by boiling 6-acetamido-3-pyridine-acetonitrile in an alkaline medium, for example in aqueous or aqueous-alcoholic potassium solution and subsequent neutralization.

Starting materials of the Formula III, wherein X is the 2-carboxy-pyrrol-1-yl group, are obtained for example by condensing compounds of the Formula III, wherein X is the amino group, with lower 2,5-dialkoxy-tetrahydro-2-furnacarboxylic acid alkyl esters, and subsequently hydrolyzing the resulting 6-(2-alkoxycarbonyl-pyrrol-1-yl)-3-pyridine-acetic acids which are optionally substituted in accordance with the definitions of $R_1$ and $R_2$.

Intermediate products of the Formula III, wherein X is the 2-carboxy-pyrrol-1-yl group, can also be obtained in the reaction of compounds of the Formula III, wherein X is the amino group, with a compound of the Formula V, e.g. with mucic or saccharic acid.

Starting compounds of the Formula III, wherein X is the 2,5-dihydro-pyrrol-1-yl group, can be manufactured, for example, by reacting a compound of the Formula III, wherein X is the amino group, with a compound of the formula

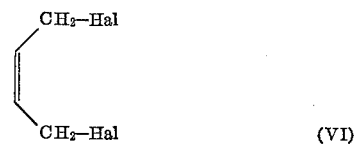

in which Hal represents a halogen atom, preferably chlorine, bromine or iodine, in the presence of an alkaline condensation agent, for example an alkali amide or hydride, such as lithium or sodium amide, lithium or sodium hydride, an alkali lower alkyl, such as butyl lithium, an alkali lower alkanolate or hydroxide, such as sodium methylate, or potassium hydroxide.

As reaction media it is possible to use inert organic solvents, such as dimethyl formamide, diethyl ether, benzene or toluene, or, in using the cited alkali metal alcoholates or alkali metal hydroxides, also lower alkanols, such as methanol or ethanol.

The following examples will serve to illustrate the manufacture of the new compounds of the Formula I in more detail, but without thereby limiting the scope of the invention in any way.

EXAMPLE 1

6-(pyrrol-1-yl)-3-pyridine-acetic acid

A mixture of 15.0 g. of 6-(pyrrol-1-yl)-3-pyridine acetonitrile, 11 g. of potassium hydroxide, 300 ml. of water and 300 ml. of ethanol, is boiled under reflux for 20–24 hours. The solvent is evaporated under reduced pressure, the residue then dissolved in 80 ml. of water and the solution extracted with ether. The aqueous phase is acidified with 2 N hydrochloric acid to pH 4–5 to give the crude 6-(pyrrol-1-yl)-3-pyridine-acetic acid (M.P. 154–163°). Recrystallization from isopropanol increases the melting point to 162–166° C. The substituted acetonitrile used as starting material is obtained as follows:

(a) 119 g. of 2,5-dimethoxytetrahydrofuran are added to a solution of 150 g. of 6-amino-nicotinic acid ethyl ester in 1.4 litres glacial acetic acid and the mixture is boiled under reflux for 30 minutes. The mixture is cooled and the solvent evaporated to leave a dark residue which is distilled in a bulb tube at 120–140° C./0.01 torr and yields the 6-(pyrrol-1-yl)-nicotinic acid ethyl ester (M.P. 58–64° C.).

(b) A solution of 125 g. of 6-(pyrrol-1-yl)-nicotinic acid ethyl ester in 2 litres of toluene is treated dropwise within about 1 hour with stirring and at 5–10° C. with a 70% solution-bis-(2-methoxyethoxy)-aluminum hydride in benzene, in the course of which a weak flow of nitrogen is passed over the reaction mixture. Upon completion of the dropwise addition, stirring is continued for 1.5 hours at 20–30° C. and the reaction mixture left to stand overnight. The reaction mixture is then decomposed by the dropwise addition of 10–20 ml. of water and thoroughly stirred for 3–4 hours with 50 ml. of 2 N sodium hydroxide solution. The organic phase is isolated, dried over magnesium sulphate and evaporated, to yield crude 6-(pyrrol-1-yl)-3-pyridine-methanol (M.P. 98–102° C.) which can be reacted without further purification.

(c) A solution of 34.3 g. of 6-(pyrrol-1-yl)-3-pyridine-methanol and 24 g. of 2,6-lutidine in 400 ml. of dichloromethane is treated dropwise with stirring with a solution of 26.8 g. of thionyl chloride in 150 ml. of dichloromethane, in the course of which the temperature is kept at 10–15° C. by cooling with ice water. The reaction mixture is stirred overnight at room temperature and then shaken with 150 ml. of 2 N sodium hydroxide solution. The organic phase is isolated, washed with water (100 ml.), dried over sodium sulphate and evaporated, to yield 40.6 g. of crude 2-(pyrrol-1-yl)-5-chloromethylpyridine as a crystalline substance which is used in the following experiment without further purification.

(d) A solution of 38 g. of crude 2-(pyrrol-1-yl)-5-chloromethylpyridine in 300 ml. of dimethyl sulphoxide is treated with a solution of 12 g. of sodium cyanide in 150 ml. of dimethyl sulphoxide. The reaction mixture is then stirred for ½ hour in an oil bath of about 100° C., cooled and poured on 500 ml. of water. Extraction with ether yields crude, crystalline 6-(pyrrol-1-yl)-3-pyridine-acetonitrile (M.P. 113–119° C.).

EXAMPLE 2

4.5 g. of 6-amino-3-pyridine-acetic acid and 4.0 g. of 2,5-dimethoxytetrahydrofuran are boiled under reflux for 1 hour in 50 ml. of glacial acetic acid. The reaction mixture is evaporated under reduced pressure and the residue is recrystallized from isopropanol with the addition of activated charcoal, to yield 6-(pyrrol-1-yl)-3-pyridine-acetic acid (M.P. 162–166° C.).

The 6-amino-3-pyridine-acetic acid used as starting material is obtained as follows:

(a) A solution of 18.0 g. of 6-acetamido-nicotinic acid in 200 ml. of absolute tetrahydrofuran is treated dropwise is an atmosphere of nitrogen with 100 ml. of a 1 M solution of diborane in tetrahydrofuran while cooling with ice and stirring and the mixture is stirred for a further 3–4 hours at room temperature. The reaction mixture is decomposed carefully with 3 ml. of water and made alkaline with 10 ml. of concentrated sodium hydroxide solution. Upon addition of 200 ml. of ether, the organic phase is isolated, washed with 20 ml. of saline solution and dried over sodium sulphate. The solvent is evaporated to yield the crude 6-acetamido-3-pyridine-methanol.

(b) Analogous to Examples 1(c) and 1(d), 12 g. of 6-acetamido-3-pyridine-methanol are reacted with thionyl chloride and then with sodium cyanide to yield the 6-acetamido-3-pyridine-acetonitrile.

(c) Analogous to Example 1, 8.0 g. of 6-acetamido-3-pyridine-acetonitrile are hydrolyzed and after neutralization to pH 5–6 yield the 6-amino-3-pyridine-acetic acid.

EXAMPLE 3

6-(2-carboxypyrrol-1-yl)-3-pyridine-acetic acid is heated in an oil bath of 200° C. until the evolution of gas ceases (about 5 minutes). The resulting dark oil is distilled in a bulb tube at 170–190° C./0.02 torr to yield the 6-(pyrrol-1-yl)-3-pyridine-acetic acid which melts at 162–166° C. (from isopropanol).

The starting material is obtained as follows:

(a) A mixture of 5.2 g. of 6-amino-3-pyridine-acetic acid and 6.7 g. of 2,5-dimethoxy-tetrahydrofuran-2-carboxylic acid methyl ester is boiled under reflux overnight in 50 ml. of glacial acetic acid. The 6-(2-methoxycarbonylpyrrol-1-yl)-3-pyridine-acetic acid left as residue after the evaporation of the glacial acetic acid is boiled under reflux for 3–4 hours in a mixture of 30 ml. of ethanol and 30 ml. of 2 N sodium hydroxide solution. The mixture is concentrated and the residue taken up in 30 ml. of water and extracted with ether. The aqeuous phase is isolated and brought to pH 3–4 with 6 N hydrochloric acid. The crude 6-(2-carboxypyrrol-1-yl)-3-pyridine-acetic acid is extracted with chloroform and decarboxylated in the crude state.

EXAMPLE 4

α-Methyl-6-(pyrrol-1-yl)-3-pyridine-acetic acid

A mixture of 7.0 g. of methyl-[6-(pyrrol-1-yl)-3-pyridyl]-maleonic acid diethyl ester, 4.2 g. of potassium hydroxide, 15 ml. of water and 60 ml. of n-butanol are stirred for 4–5 hours and boiled under reflux. The solvent is evaporated under reduced pressure and the residue dissolved in 50 ml. of water and extracted with 100 ml. of ether. The aqueous phase is brought to pH 4–5 with 2 N hydrochloric acid. The precipitated acid is filtered with suction, washed with 20 ml. of water and dried at 100 torr/60° C., to yield the α-methyl-6-(pyrrol-1-yl)-3-pyridine-acetic acid (M.P. 149–152° C.).

The disubstituted malonic ester used as starting material is obtained via the following steps:

(a) Dry hydrochloric acid gas is passed for 15 hours into a solution of 20.0 g. of 6-(pyrrol-1-yl)-3-pyridine-acetonitrile (Example 1d) in 200 ml. of absolute ethanol while boiling under reflux. The reaction mixture is cooled, concentrated under reduced pressure and the residue alkaline with cold sodium carbonate solution. Extraction with ether and distillation of the ethereal extract in a bulb tube at 140–150° C./0.05 torr yields the 6-(pyrrol-1-yl)-3-pyridine-acetic acid ethyl ester in the form of a yellow oil which solidifies to a crystalline state.

(b) A solution of 2.2 g. of sodium in 150 ml. of absolute ethanol is added dropwise at 75–78° C. with about 5 minutes to a solution of 17.3 g. of 6-pyrrol-1-yl)-3-pyridine-acetic acid ethyl ester in 60 ml. of diethyl carbonate, the ethanol being distilled off over a Vigreux column. Distillation is continued by raising the bath temperature, until the boiling temperature at the column head is 118° C. A further 50 ml. of diethyl carbonate is then added and distillation continued until the vapor temperature is 120° C. The reaction mixture is then poured into a mixture of 50 g. of ice and 7 ml. of glacial acetic acid and extracted with 300 ml. of ether. The ether phase is isolated, washed neutral with bicarbonate solution, dried over sodium sulphate and evaporated. The residue crystallizes on cooling and the crystals are washed with petroleum ether (40–50° C.) to yield the [6-(pyrrol-1-yl)-3-pyridyl]-malonic acid diethyl ester (M.P. 86–88° C.).

(c) A solution of 12.2 g. of [6-(pyrrol-1-yl)-3-pyridyl]-malonic acid diethyl ester in 130 ml. of dimethyl formamide is treated in small amounts while stirring with 1.9 g. of 50% sodium hydride suspension in mineral oil. Stirring is continued for 1 hour and then 5.7 g. of methyl iodide are added dropwise, in the course of which the temperature rises to 45° C. One hour later a further 2.0 g. of methyl iodide are added, the mixture is stirred for 5 hours and left to stand overnight. After the mixture has been neutralized with a few drops of concentrated hydrochloric acid, the solvent is evaporated off under reduced pressure and the methyl-[6-(pyrrol-1-yl) - 3 - pyridyl]-malonic acid diethyl ester is isolated as in Example (b); melting point 69–72° C. (from isopropanol).

EXAMPLE 5

α-Methyl-6-(pyrrol-1-yl)-3-pyridine-acetic acid

A mixture of 13.7 g. of methyl-[6-(pyrrol-1-yl)-3-pyridyl]-cyanoacetic acid ethyl ester, 9.5 g. of potassium hydroxide, 15 ml. of water and 180 ml. of n-butanol is stirred and heated to the boil under reflux for 10 hours. The solvent is evaporated off under reduced pressure and the residue is then partitioned between 100 ml. of water and 100 ml. of ethyl acetate. The aqueous phase is isolated and brought to pH 4 with 2 N hydrochloric acid. The precipitated crystals are filtered with suction, dissolved once more in 140 ml. of 10% potassium carbonate solution and extracted again with 50 ml. of ethyl acetate. The aqueous phase is isolated and brought to pH 4 with 2 N hydrochloric acid. The precipitated α-methyl-6-(pyrrol-1-yl)-3-pyridine-acetic acid melts at 149–152° C. (from isopropanol).

The substituted cyanoacetic acid ester used as starting material is manufactured as follows:

(a) A solution of 50.0 g. of 6-(pyrrol-1-yl)-3-pyridine-acetonitrile in a total amount of 450 ml. of diethyl carbonate (in separate amounts of 220, 180 and 50 ml.) is reacted with a solution of 8 g. of sodium in 500 ml. of absolute ethanol as described in Example 4(b). The reaction mixture is neutralized with 26 ml. of glacial acetic acid in 170 g. of ice, to yield the [6-(pyrrol-1-yl)-3-pyridyl]-cyano-acetic acid ethyl ester in the form of a reddish oil, which is distilled in a bulb tube at 160–180° C./0.05 torr. The pure product melts at 73–75° C. (from isopropanol).

(b) A solution of 27.2 g. of [6-(pyrrol - 1 - yl) - 3-pyridyl]-cyanoacetic acid ethyl ester in 280 ml. of dimethyl formamide is reacted with 5.1 g. of sodium hydride (50% in oil) and subsequently with 21 g. of methyl iodide as described in Example 4(c). Distillation in a bulb tube at 130–150° C./0.01 torr yields the methyl-[6-(pyrrol-1-yl)-3-pyridyl]-cyanoacetic acid ethyl ester in the form of a reddish brown oil, which is hydrolyzed without further purification.

EXAMPLE 6

α-ethyl-6-(pyrrol-1-yl)-3-pyridine-acetic acid

Analogous to Example 5, 12.7 g. of ethyl-[6-(pyrrol-1-yl)-3-pyridyl]-cyanoacetic acid ethyl ester are boiled under reflux and worked up as described, to yield the α-ethyl-6-(pyrrol-1-yl)-3-pyridine-acetic acid which melts at 134–137° C. (from isopropanol).

The starting material is obtained as follows:

A solution of 13.4 g. of [6-(pyrrol-1-yl) - 3 - pyridyl]-cyanoacetic acid ethyl ester (see Example 5(a)) in 140 ml. of dimethyl formamide is reacted with 2.5 g. of sodium hydride (50% in oil) and with 12.3 g. of ethyl iodide as in Example 5(b), to yield the ethyl-[6-(pyrrol-1-yl)-3-pyridyl]-cyanoacetic acid ethyl ester in the form of a yellow oil, which distills in a bulb tube at 130–140° C./0.01 torr.

EXAMPLE 7

7.0 g. of α-methyl-6-(pyrrol-1-yl)-3-pyridine-acetonitrile are boiled under reflux for 20–24 hours with a mixture of 7 g. of potassium hydroxide, 10 ml. of water and 100 ml. of n-butanol. The reaction mixture is worked up as in Example 1 to yield the α-methyl-6-(pyrrol-1-yl)-3-pyridine-acetic acid which melts at 149–152° C. (from isopropanol).

The starting material is obtained as follows:

A solution of 11.0 g. of methyl-[6-(pyrrol - 1 - yl) - 3-pyridyl]-cyanoacetic acid ethyl ester (see Example 5(b)) in 150 ml. of ethanol is treated with 22 ml. of 2 N sodium hydroxide solution and the reaction mixture is left to stand for 5 hours. The solvent is evaporated off under reduced pressure, the residue then taken up in 200 ml. of ether and the ether solution shaken out with 20 ml. of water. Upon evaporation, the ether phase yields 7.8 g. of crude nitrile which melts at 60–70° C. This product is distilled in a bulb tube at 100–120° C./0.02 torr to yield the α-methyl-6-(pyrrol-1-yl)-3-pyridine-acetonitrile which melts at 67–70° C. and sinters from 60° C.

EXAMPLE 8

A solution of 10.0 g. of α-methyl-6-(pyrrol-1-yl)-3-pyridine-acetonitrile (see Example 7(a)) in 100 ml. of absolute ethanol is converted with hydrochloric acid gas (analogous to Example 4(a)) into the α-methyl-6-(pyrrol-1-yl)-3-pyridine-acetic acid ethyl ester, which distills in a bulb tube at 120–130° C./0.1 torr.

EXAMPLE 9

A solution of 8.0 g. of 6-(pyrrol-1-yl)-3-pyridine-acetic acid ethyl ester in 100 ml. of dimethyl formamide is treated gradually with 1.5 g. of a 50% sodium hydride suspension in mineral oil. After stirring for 30 minutes, the resulting solution is poured all at once into a solution of 42 g. of methyl iodide in 100 ml. of dimethyl formamide and the mixture is stirred for 1–2 hours. The precipitated sodium iodide is filtered with suction and the filtrate evaporated under reduced pressure. The residue is distilled at 130–140° C./0.2 torr in a bulb tube and yields the α-methyl-6-(pyrrol-1-yl)-3-pyridine-acetic acid ethyl ester.

EXAMPLE 10

To a suspension of sodium amide in 200 ml. of liquid ammonia (prepared from 2.3 g. of sodium) are added 8.1 g. of 6-(pyrrol-1-yl)-3-pyridine-acetic acid and the reaction mixture is stirred for 1 hour with reflux cooling using Dry Ice. Then 5.7 g. of ethyl iodide are added and stirring is continued for 1 hour. The reaction mixture is decomposed by addition of 7 g. of ammonium chloride, the ammonia is evaporated and replaced by 200 ml. of ether. The ether solution is washed with 20 ml. of water, dried and evaporated. The residue is recrystallized repeatedly from isopropanol and yields the α-ethyl-6-(pyrrol-1 - yl) - 3 - pyridine - acetic acid which melts at 134–137° C.

EXAMPLE 11

A mixture of 4.6 g. of α-ethyl-6-(pyrrol-1-yl)-3-pyridineacetic acid in 50 ml. of absolute ethanol is heated under reflux to the boil and saturated with dry hydrochloric acid gas. The reaction mixture is concentrated under reduced pressure after 5 hours, the residue treated with 100 ml. of ether and made slightly alkaline with saturated sodium bicarbonate solution. The ether phase is dried and evaporated to yield the α-ethyl-6-(pyrrol-1-yl)-3-pyridine-acetic acid ethyl ester in the form of a yellow oil.

EXAMPLE 12

A mixture of 3.0 g. of 6-(pyrrol-1-yl)-3-pyridine-acetic acid, 40 ml. of 1-butanol and 1 ml. of concentrated sulphuric acid are heated under reflux for 6 hours. The butanol is then evaporated off in a rotary evaporator at 10–20 torr, the residue taken up in benzene, and the benzene solution is washed with 20 ml. of potassium bicarbonate solution and 20 ml. of water and dried over sodium sulphate. The benzene is evaporated off to yield the 6-(pyrrol-1-yl)-3-pyridine-acetic acid-n-butyl ester which distills in a bulb tube at 170° C./0.1 torr.

EXAMPLE 13

A solution of 1 g. of α-methyl-6-(pyrrol-1-yl)-3-pyridine-acetic acid in 4.6 ml. of N sodium hydroxide solution is evaporated to dryness and the residue is recrystallized from ethanol to yield the sodium salt of α-methyl-6-(pyrrol-1-yl)-3-pyridine-acetic acid (M.P. 235–237° C.). The sodium salt of 6-(pyrrol-1-yl)-3-pyridine-acetic acid which melts at 216–222° C. (from ethanol) is obtained analogously.

EXAMPLE 14

A solution of 1.0 g. of α-methyl-6-(pyrrol-1-yl)-3-pyridine-acetic acid in 2 ml. of benzene is treated with 0.41 g. of N,N-dimethylaminoethanol. The residue which remains after the benzene has been evaporated off is recrystallized from acetone/ethanol, to yield the N,N-dimethylaminoethanol salt of α-methyl-6-(pyrrol-1-yl)-3-pyridine-acetic acid (M.P. 67–69° C.).

What is claimed is:
1. A compound of the formula

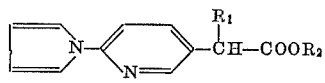

(I)

wherein $R_1$ represents hydrogen or a methyl or ethyl group and $R_2$ represents hydrogen or a lower alkyl group containing from 1 to 4 carbon atoms and a pharmaceutically acceptable salt of a free carboxylic acid with a base.

2. A compound according to claim 1 of Formula I, wherein $R_1$ is hydrogen or methyl and $R_2$ is hydrogen.

3. A compound according to claim 1, which is 6-(pyrrol-1-yl)-3-pyridineacetic acid.

4. A compound according to claim 1, which is α-methyl-6-(pyrrol-1-yl)-3-pyridineacetic acid.

5. A compound according to claim 1, which is α-ethyl-6-(pyrrol-1-yl)-3-pyridineacetic acid.

6. A compound according to claim 1, which is α-methyl-6-(pyrrol-1-yl)-3-pyridineacetic acid ethyl ester.

7. A compound according to claim 1, which is α-ethyl-6-(pyrrol-1-yl)-3-pyridineacetic acid ethyl ester.

8. A compound according to claim 1, which is 6-(pyrrol-1-yl)-3-pyridineacetic acid n-butyl ester.

References Cited

UNITED STATES PATENTS 3,381,015  4/1968  Shen et al. _____ 260—295 R

ALAN L. ROTMAN, Primary Examiner

U.S. Cl. X.R.

260—247.2 R, 247.2 B, 292, 293.69; 424—248, 266, 267, 265